(12) United States Patent
Yana Motta et al.

(10) Patent No.: US 8,709,275 B2
(45) Date of Patent: Apr. 29, 2014

(54) HYDROFLUOROCARBON REFRIGERANT COMPOSITIONS FOR HEAT PUMP WATER HEATERS

(75) Inventors: Samuel F. Yana Motta, East Amherst, NY (US); Lawrence Chin, Singapore (SG); Zhili Lu, Shanghai (CN); Mark W. Spatz, East Amherst, NY (US); Maggie Cao, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 21 days.

(21) Appl. No.: 13/319,139

(22) PCT Filed: May 3, 2010

(86) PCT No.: PCT/US2010/033362
§ 371 (c)(1), (2), (4) Date: Jan. 10, 2012

(87) PCT Pub. No.: WO2010/129461
PCT Pub. Date: Nov. 11, 2010

(65) Prior Publication Data
US 2012/0096877 A1 Apr. 26, 2012

Related U.S. Application Data

(60) Provisional application No. 61/176,773, filed on May 8, 2009.

(51) Int. Cl.
*C09K 5/04* (2006.01)

(52) U.S. Cl.
USPC .......................................................... 252/67

(58) Field of Classification Search
USPC .......................................................... 252/67
See application file for complete search history.

(56) References Cited

U.S. PATENT DOCUMENTS

| | | | | |
|---|---|---|---|---|
| 7,569,170 B2 * | 8/2009 | Minor | ............................ | 264/53 |
| 8,024,937 B2 * | 9/2011 | Minor | ............................ | 62/115 |
| 2006/0243944 A1 * | 11/2006 | Minor et al. | ..................... | 252/67 |
| 2010/0122545 A1 * | 5/2010 | Minor et al. | ................. | 62/324.1 |

* cited by examiner

*Primary Examiner* — John Hardee
(74) *Attorney, Agent, or Firm* — Colleen D. Szuch

(57) ABSTRACT

Hydrofluorocarbon refrigerant compositions enable the use of existing compressor technologies in heat pump water heaters in a reliable (low discharge temperatures and pressures) and efficient (high capacity and efficiency) manner. The refrigerant comprises blends of pentafluoroethane (HFC-125), difluoromethane (HFC-32), tetrafluoroethane (HFC-134a) and tetrafluoropropene (HFO-1234ze).

14 Claims, 5 Drawing Sheets

HYDROFLUOROCARBON REFRIGERANT COMPOSITIONS FOR HEAT PUMP WATER HEATERS

CROSS-REFERENCE TO RELATED APPLICATIONS

The present invention is a national phase application which is related to and claims the priority benefit of International Application No. PCT/US10/33362, filed on May 3, 2010, which claims priority benefit of U.S. Provisional Application No. 61/176,773 filed on May 8,2009.

FIELD OF THE INVENTION

The invention relates generally to compositions for use as refrigerants. More particularly, the invention relates to hydrofluorocarbon refrigerant compositions for use in heat pump water heater systems.

BACKGROUND OF THE INVENTION

Hot water is widely needed in domestic buildings, commercial buildings, and industry for heating, bathing, industrial processes, etc. Gas-fired boilers and electric heaters are mostly used to supply hot water. A heat pump water heater (HPWH) is another type of equipment to supply hot water. The use of HPWH in domestic and light commercial applications is growing rapidly due to its low environmental impact as HPWH uses renewable energy as a heat source.

As shown in FIG. 1, a heat pump water heater unit (HPWH) mainly includes a system including a compressor 1, a condenser 2, an expansion device 3, and an evaporator 4. The evaporator can be, for example, an air-source type or a water source type. Working fluid (refrigenat) is charged into the HPWH system and then circulated through the system using a vacuum pump. A heat exchange occurs between water and the working fluid in the condenser.

During the circulation cycle of HPWH, the compressor 1 discharges high-pressure hot working fluid vapor into the condenser 2. The hot working fluid (side 2') loses heat to water (side 2") in the condenser 2 and condenses into liquid. The water absorbs the heat from the working fluid becoming hot water. The liquid working fluid then flows through the expansion device 3 and is throttled into a low-pressure two-phase working fluid. The low-pressure two-phase working fluid enters the evaporator 4 where the fluid absorbs heat and then evaporates into a low-pressure vapor which is then suctioned into the compressor 1. The working fluid flows through the HPWH system in direction 5. Water flows through the condenser 2 in water flow direction 6.

A new requirement was established for HPWHs due to problems with legionnella contamination. HPWHs now need to provide water temperature above 60° C. (ASHRAE Guideline 12-2000). In some cases, this temperature needs to be 65° C. due to a temperature drop in the connecting lines. An example of technical requirements for some HPWHs is as follows: Reliability: 110° C. Maximum compressor discharge temperature, 28 bar maximum discharge pressure. Performance: High efficiency to reduce environmental impact, acceptable capacity to fulfill user needs.

Current working fluids used in heat pump water heaters include HCFC-22, HFC-134a, HFC-410A, HFC-407C and HFC-417A. However, HCFC-22, HFC-410A and HFC-407C are unsuitable to supply 60-65° C. hot water and can only be used in existing compressor technologies due to excessive temperature and pressure at the compressor discharge. HCFC-22 is being phased out worldwide because it attacks the ozone layer and can not supply 60-65° C. hot water due to its very high discharge temperature and pressure. HFC-407C can not supply 60-65° C. hot water because its discharge temperature and pressure are very high. HFC-410A can not supply 60-65° C. hot water because its discharge temperature and pressure are very high.

HFC-134a, and HFC-417A can supply 60-65° C. hot water with existing compressor technologies, but their performances are marginal. HFC-134a can supply 60-65° C. hot water with low discharge temperature and pressure, but it has very small capacity and requires a large compressor. Moreover the capacity decreases greatly when the ambient temperature is less than 5° C. HFC-417A is a popular refrigerant for heat pump water heater units to supply 60-65° C. hot water since its discharge temperature and pressure are almost safe for existing compressors (discharge pressure exceeds 28 MPa) and its capacity and efficiency are marginal.

SUMMARY OF THE INVENTION

A novel refrigerant has been discovered, which has excellent properties for use as a working fluid in heat pump water heaters. This refrigerant allows HPWHs to supply 60 to 65° C. hot water in a reliable and efficient way.

In one aspect of the invention, the refrigerant comprises blends of pentafluoroethane (HFC-125), difluoromethane (HFC-32), tetrafluoroethane (HFC-134a) and tetrafluoropropene (HFO-1234ze). In one embodiment, the blend comprises approximately 8-20 wt % HFC-125, approximately 8-20 wt % HFC-32, approximately 60-72 wt % HFC-134a, and approximately 1-16 wt % HFO-1234ze. In another embodiment the blend comprises approximately 8-12 wt % HFC-125, approximately 12-18 wt % HFC-32, approximately 70-75 wt % HFC-134a and approximately 3-8 wt % HFO-1234ze. In a further embodiment the blend comprises approximately 14 wt % pentafluoroethane, approximately 14 wt % difluoromethane, 66 wt % tetrafluoroethane and approximately 6 wt % tetrafluoropropene.

In a further embodiment, the total weight percentage of above four components is 100 wt %. That is, no other components are present in the refrigerant. In another embodiment the total weight percentage of the above four components is less than 100 wt % of the refrigerant composition and additional components are included in the refrigerant composition. In a further embodiment, the additional components beyond the four above components do not materially affect the basic and novel characteristics of the refrigerant composition. For example, additional components may be added to enhance or provide certain functionality to the composition, or in some cases to reduce the cost of the composition.

The present invention is particularly directed to the use of the refrigerants (HFC-125, HFC-32, HFC-134a, and HFO-1234ze blends) as working fluids in heat pump water heater units comprising at least a compressor, an evaporator, and a condenser, wherein the working fluid flows through the unit.

The present invention is further directed to a method of heating water comprising flowing the refrigerant as a working fluid through a system comprising a compressor, an evaporator, and a condenser, and flowing water though the condenser, wherein working fluid entering the condenser transfers heat to the water, heating the water to a temperature of above 60° C.

DETAILED DESCRIPTION OF THE INVENTION

Figure 1:
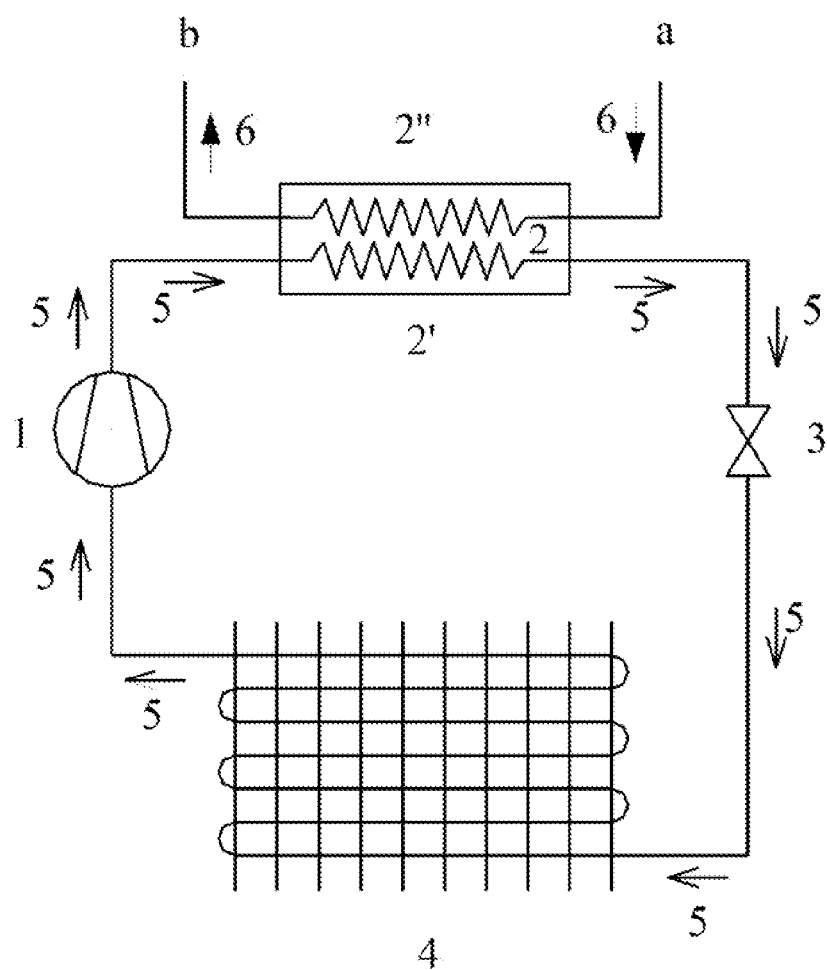
FIG. 1 depicts a heat pump water heater flow chart.

The present invention is directed to refrigerant compositions prepared from blends of HFC-125, HFC-32, HFC-134a and HFO-1234ze. The blends can be used to achieve beneficial thermodynamic properties as working fluids for systems such as heat pump water heaters. The components can be blended in manufacturing facilities as standard in the art and well understood in the industry, including, but not limited to, using calibrated flow meters for each of the components. The components can be blended by adding the individual components into a vessel, tube, or other container and then blending by mixing or using the flow in the container until a well-distributed blend is achieved.

It was discovered that refrigerant compositions prepared from certain blends provided good performance and reliable operation in heat pump water heaters. In one particular embodiment, the blend comprises approximately 8-20 wt % HFC-125, approximately 8-20 wt % HFC-32, approximately 60-72 wt % HFC-134a, and approximately 1-16 wt % HFO-1234ze. In a further embodiment of the present invention, the blend comprises approximately 8-12 wt % HFC-125, approximately 12-18 wt % HFC-32, approximately 70-75 wt % HFC-134a and approximately 3-8 wt % HFO-1234ze.

In a specific embodiment of the present invention, the blend comprises approximately 14 wt % pentafluoroethane, approximately 14 wt % difluoromethane, 66 wt % tetrafluoroethane and approximately 6 wt % tetrafluoropropene.

In a further embodiment, the total weight percentage of above four components is 100 wt %. That is, no other components are present in the refrigerant composition.

In another embodiment the total weight percentage of the above four components is less than 100 wt % of the refrigerant composition and additional components are included in the refrigerant composition. In a further embodiment, the additional components beyond the four above components do not materially affect the basic and novel characteristics of the refrigerant composition. For example, additional components may be added to enhance or provide certain functionality to the refrigerant composition, or in some cases to reduce the cost of the refrigerant composition.

Additional components that may be added to the refrigerant composition include, but are not limited to, lubricants, compatibilizers, surfactants, and solubilizing agents.

Suitable compatibilizers, such as propane, butanes and pentanes, may be added for the purpose of aiding compatibility and/or solubility of the lubricant. Such compatibilizers are generally present in amounts of from about 0.5 to about 5 percent by weight of the composition.

Combinations of surfactants and solubilizing agents may also be added to the present compositions to aid oil solubility, as disclosed by U.S. Pat. No. 6,516,837, the disclosure of which is incorporated by reference. Commonly used refrigeration lubricants such as Polyol Esters (POEs) and Poly Alkylene Glycols (PAGs) that are used in refrigeration machinery with hydrofluorocarbon (HFC) refrigerants may be used with the refrigerant compositions of the present invention.

The refrigerant compositionss may be used as working fluids in a heat pump water heater unit (HPWH) including a compressor 1, a condenser 2, an expansion device 3, and an evaporator 4 as shown in FIG. 1 and discussed above.

The compressor can be, for example, a rotary type, a scroll type, a reciprocating type, or a screw type. The condenser can be, for example, a concentric type or a brazed-plate type. The expansion device can be, for example, a capillary tube, a thermal expansion valve, or an electric expansion valve. The evaporator can be, for example, an air-source type or a water source type. Working fluid is charged into the HPWH system and then circulated through the system using a vacuum pump. A heat exchange occurs between water and the working fluid in the condenser.

During the circulation cycle of the HPWH, the compressor 1 discharges high-pressure hot working fluid vapor into the condenser 2. The hot working fluid (side 2') loses heat to water (side 2") in the condenser 2 and condenses into liquid. The water absorbs the heat from the working fluid becoming hot water. The liquid working fluid then flows through the expansion device 3 and is throttled into a low-pressure two-phase working fluid. The low-pressure two-phase working fluid enters the evaporator 4 where the working fluid absorbs heat and then evaporates into a low-pressure vapor which is then suctioned into the compressor 1. The working fluid flows through the HPWH system in direction 5. Water flows through the condenser 2 in water flow direction 6.

The water is heated in the condenser to above 60° C., preferably to at least 65° C.

The present invention is more fully illustrated by the following non-limiting examples. It will be appreciated that variations in proportions and alternatives in elements of the components of the invention will be apparent to those skilled in the art and are within the scope of the invention.

EXAMPLES

The following examples demonstrate the operation of a heat pump. Discharge pressures that are too high will cause damage to the components of the unit and discharge temperatures that are too high will degrade the lubricant oil. The technical requirements for the compressors are as follows:

1) 110° C. maximum compressor discharge temperature
2) 28 bar maximum discharge pressure Performance evaluations were carried out using these assumptions: 1) To supply 65° C. hot water, a condensation temperature of 70° C. is needed; 2) The degree of subcooling at the expansion device inlet is set to 2° C.; 3) The evaporating temperature is set to 5° C. (corresponds to a 10° C. ambient temperature); 4) The degree of superheat at evaporator outlet is set to 5° C.; 5) The compressor efficiency is assumed to be 0.65; 6) The pressure drop and heat transfer in the connecting lines (suction and liquid lines) are considered negligible. Similarly, heat leakage through the compressor shell is ignored.

Example 1

The composition R125/R32/R134a/HFO-1234ze is selected to compare with other working fluids. The weight percentages of the components are as follows: approximately 14% HFC-125; approximately 14% HFC-32, approximately 66% HFC134a and approximately 6% HFO-1234ze. (This embodiment is named HPWH-50.) The prefix "R" and the prefix "HFC" when describing different compositions are interchangeable as used herein.

Working fluids for comparison under the above working conditions are as follows.

| ASHRAE Code | Composition |
|---|---|
| R22 | R22 (100%) |
| R407C | R134a/R125/R32 (52%/25%/23%) |
| R417A | R134a/R125/R600 (50/46.6/3.4) |
| R134a | R134a (100%) |
| HPWH-50 | R125/R32/R134a/HFO-1234ze (app. 14%/app. 14%/app. 66%/app. 6%) |

All calculations were performed using the NIST Refprop 7.0 software.

Figure 2:
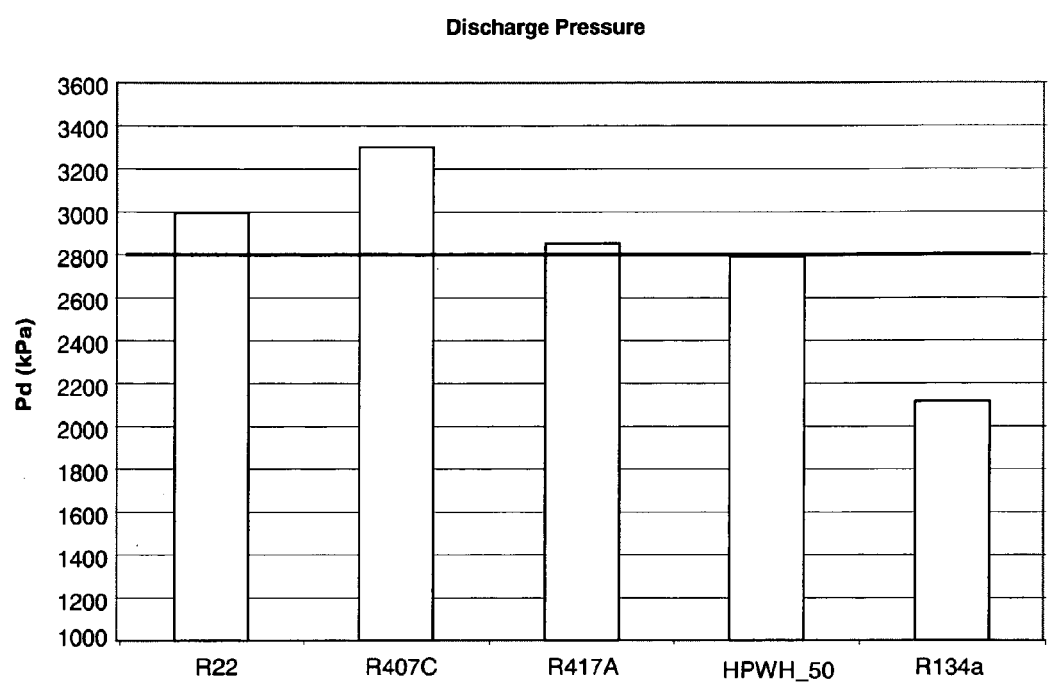
FIG. 2 depicts the discharge pressures of different working fluids.

FIG. 2 shows the discharge pressures of different working fluids under the above working conditions. Only R134a and HPWH-50's discharge pressures are below 28 bar. Thus, only these two can meet the most important requirement on pressure-bearing characteristics for existing HPWH units. Discharge pressures of R22 and HFC-407C greatly exceed the limit of 28 bar. Thus, R22 and HFC-407C and HFC-404A absolutely can not be used in existing HPWH units to supply 65 C hot water. Discharge pressures of HFC-417A slightly exceed 28 bar.

Figure 3:
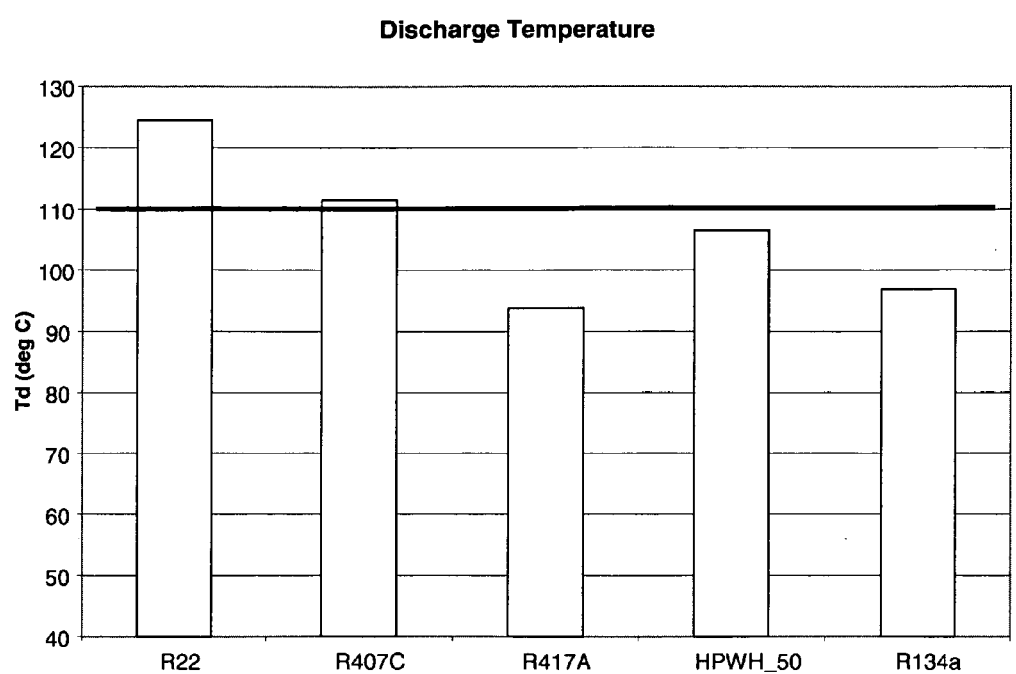
FIG. 3 depicts the discharge temperatures of different working fluids.

FIG. 3 shows the discharge temperatures of different working fluids under the above working conditions. R22 and HFC-407C have discharge temperatures that exceed 110 C. Thus these two can not meet the most important requirement on discharge temperature characteristics for existing HPWH units.

Only HPWH-50 and R134a can meet the reliable long-term running requirements for existing HPWH systems for discharge pressure and temperature.

Example 2

Figure 4:
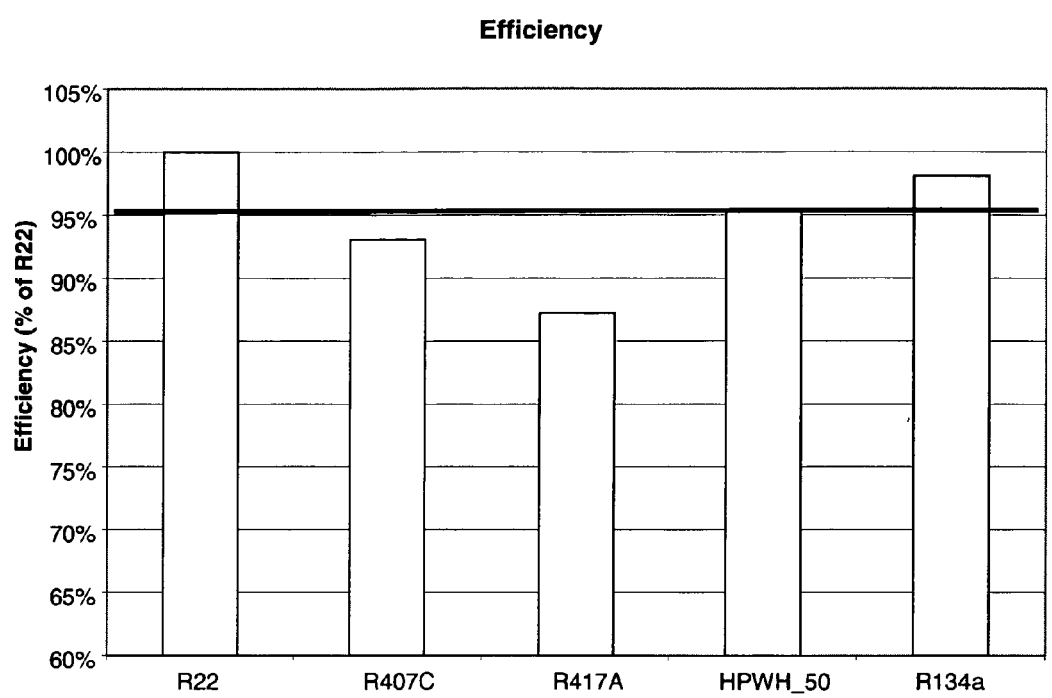
FIG. 4 depicts the efficiency of the different working fluids compared to R22.
Figure 5:
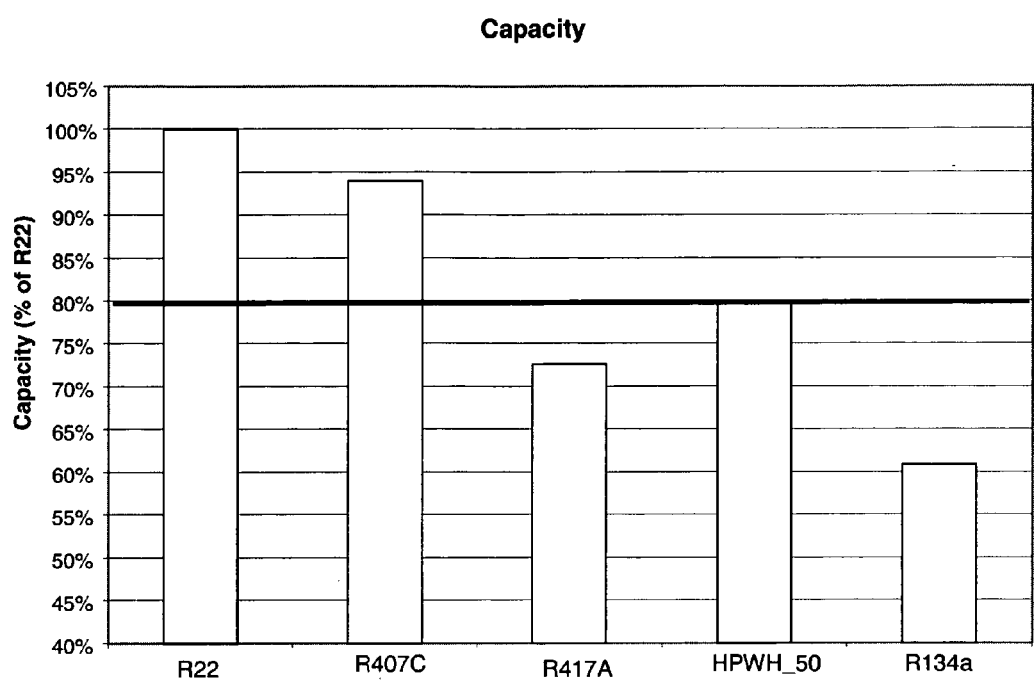
FIG. 5 depicts HFC-134a having very low heating capacity.

Further analysis of the evaluations performed in Example 1 show that HFC-134a has better efficiency than HPWH-50 (FIG. 4) but FIG. 5 shows HFC-134a has very low heating capacity. To recover this capacity, manufacturers will need a new compressor and possibly larger heat exchangers. Compared with HFC-417A, which is used to supply 55-60 C hot water in existing HPWH systems, HPWH-50 has 7% higher efficiency and 5% higher capacity. HPWH-50's performances are better than that of HFC-417A. Overall HPWH-50 has a superior performance.

Example 3

Global Warming Potential (GWP) of some single components listed in following table are from JAMES M. CALM, PE., "Refrigerant Data Update", HPAC Engineering, January 2007. The GWP of each mixing working fluid is the sum of the mass percentage multiplied by GWP of each component. From the following table, HFC-417A has a very high GWP. HPWH-50 and R134a have a moderate GWP, which are very benign to the environment.

| Working Fluids | GWP100 | Working Fluids | GWP100 |
|---|---|---|---|
| R125 | 3500 | HFC-417A | 2346.7 |
| R134a | 1430 | HFC-407C | 1773.9 |
| R600 | ~20 | HPWH-50 | 1528.7 |
| R143a | 4470 | | |
| R32 | 675 | | |
| HFO-1234ze* | 6 | | |

*GWP of HFO-1234ze is from Honeywell's internal material

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A refrigerant composition consisting of approximately 8-20 wt % pentafluoroethane (HFC-125), approximately 8-20 wt % difluoromethane (HFC-32), approximately 60-72 wt % tetrafluoroethane (HFC-134a) and approximately 1-16 wt % tetrafluoropropene (HFO-1234ze).

2. The refrigerant composition of claim 1 wherein difluoromethane (HFC-32) is provided in an amount of approximately 12-18 wt % and tetrafluoropropene (HFO-1234ze) is provided in an amount of approximately 3-8 wt %.

3. The refrigerant composition of claim 1 consisting of approximately 14 wt % pentafluoroethane (HFC-125), approximately 14 wt % difluoromethane (HFC-32), 66 wt % tetrafluoroethane (HFC-134a) and approximately 6 wt % tetrafluoropropene (HFO-1234ze).

4. A refrigerant composition comprising approximately 8-20 wt % pentafluoroethane (HFC-125), approximately 8-20 wt % difluoromethane (HFC-32), approximately 60-72 wt % tetrafluoroethane (HFC-134a) and approximately 1-16 wt % tetrafluoropropene (HFO-1234ze).

5. The refrigerant composition of claim 4 wherein difluoromethane (HFC-32) is provided in an amount of approximately 12-18 wt % and tetrafluoropropene (HFO-1234ze) is provided in an amount of approximately 3-8 wt %.

6. The refrigerant composition according to claim 4 or claim 5 further comprising at least one additional component selected from the group consisting of lubricants, compatibilizers, surfactants, and solubilizing agents.

7. A heat pump water heater system comprising a compressor, an evaporator, and a condenser, wherein a refrigerant composition flows through the system, the refrigerant composition comprising the refrigerant composition of claim 4.

8. The heat pump water system of claim 7 wherein the refrigerant flows through the condenser in a first direction and water flows through the condenser in a second direction in order to absorb heat from the refrigerant, wherein the water is heated to a temperature above 60° C.

9. The heat pump water system of claim 8 wherein the water is heated to a temperature of at least 65° C.

10. A method of heating water comprising flowing a refrigerant composition through the system of claim 9 and flowing water though the condenser, wherein hot refrigerant entering the condenser transfers heat to the water, heating the water to a temperature of above 60° C.

11. The method of heating water of claim 10 further comprising heating the water to a temperature of at least 65° C.

12. A refrigerant composition consisting essentially of approximately 8-20 wt % pentafluoroethane (HFC-125), approximately 8-20 wt % difluoromethane (HFC-32), approximately 60-72 wt % tetrafluoroethane (HFC-134a) and approximately 1-16 wt % tetrafluoropropene (HFO-1234ze).

13. The refrigerant composition of claim 12 wherein difluoromethane (HFC-32) is provided in an amount of approximately 12-18 wt % and tetrafluoropropene (HFO-1234ze) is provided in an amount of approximately 3-8 wt %.

14. The refrigerant composition according to claim 12 or claim 13 further consisting essentially of at least one additional component selected from the group consisting of lubricants, compatibilizers, surfactants, and solubilizing agents.

* * * * *